Inventor:
John A. McInerney.
By Joseph O. [signature] Atty.

United States Patent Office 3,204,922
Patented Sept. 7, 1965

3,204,922
DISC-STEM CONNECTION FOR VALVES
John A. McInerney, Evergreen Park, Ill., assignor to Crane Co., Chicago, Ill., a corporation of Illinois
Filed Feb. 25, 1963, Ser. No. 260,702
2 Claims. (Cl. 251—88)

This invention relates generally to a valve construction, and, more particularly, it is concerned with a novel disc-stem connection for valves and the like.

Heretofore, one of the problems confronting valve designers and manufactures has been to meet the requirement of many organizations, such as the United States Navy, for example, that the usual stem-disc connecting means employed, such as screw threads, be eliminated. This structural rejection is based upon the fact that in many installations of unusually severe service, the disc-stem ring threaded connection between the stem and the valve closure member is not considered to be sufficiently sturdy and durable for the severe services encountered. In addition, of course, there is the fact that vibration in a pipe line may seriously interfere with the security of the joint effected by the threads and there have been many instances where actual separation has taken place between the stem and closure member because of the failure of the threads to function properly, thus making the valve in such cases inoperative.

Therefore, it is one of the more important objects to provide for a valve construction specifically directed to a disc-stem connection in which such objections are overcome and in addition provides for the connection being conveniently and economically made in the field if and when inspection indicates that such adjustment or replacement is necessary.

In some cases in the past in those installations in which the valves are installed in the piping with the line fluid pressure above the valve closure member, the valve opening force is transmitted from the valve stem to the closure member with an unusually high specific load. This condition causes the connections to wear out prematurely and eventually resulting in a poor connection and a need for prompt replacement. Also in such cases, the removal of the connecting means such as lock-welds, balls, or pins, is relatively difficult and poses a severe problem in the field where special tools or equipment are not ordinarily available.

Therefore, one of the more important objects of this invention is to avoid these difficulties, and, as will hereinafter become apparent, such object is attained with a novel sturdy construction capable of quick assembly and disassembly when necessary.

Figure 1:
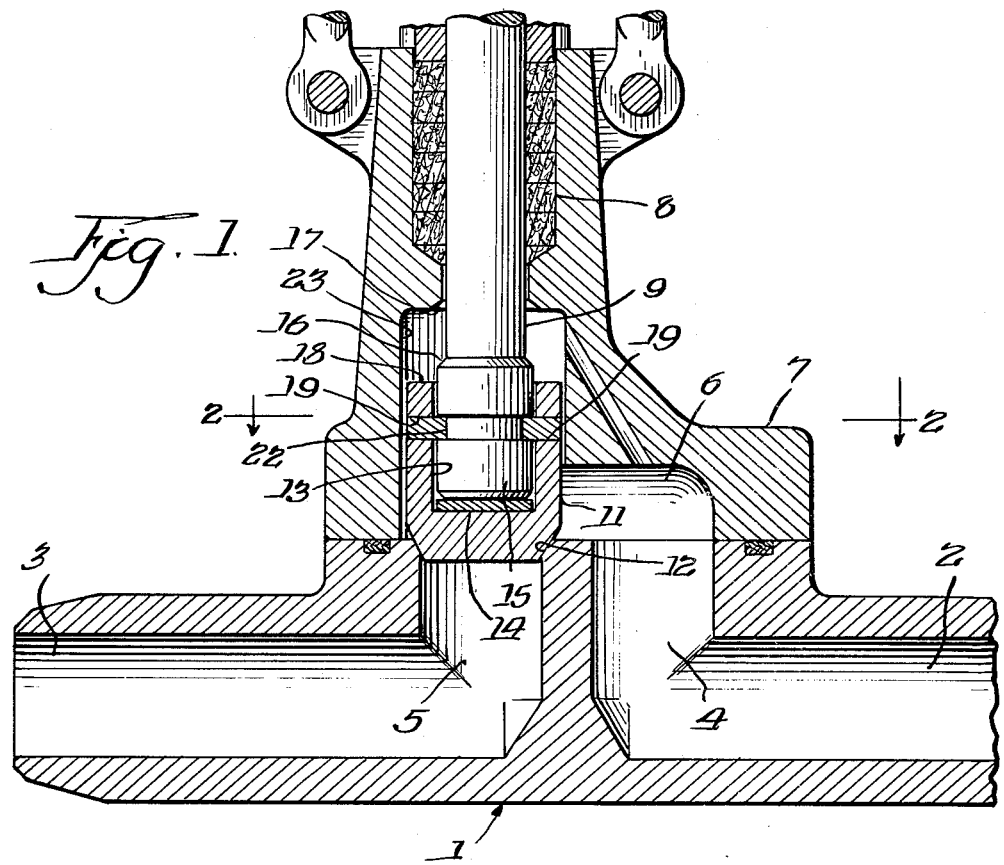
Figure 2:
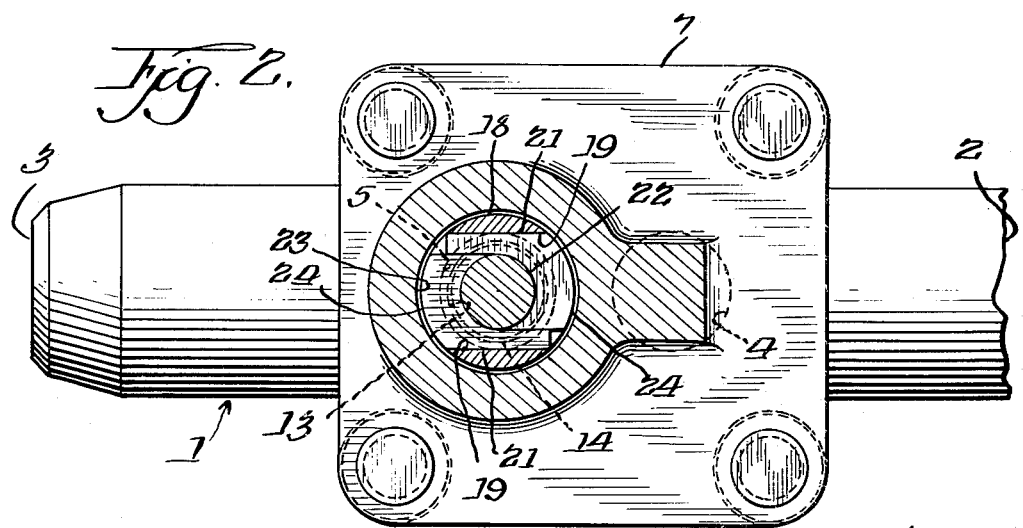

Other objects and advantages will become more readily apparent upon proceeding with the specification, read in light of the accompanying drawings, in which:

FIG. 1 is a fragmentary sectional assembly view of a valve embodying my invention; and FIG. 2 is a transverse sectional view taken on the line 2—2 of FIG. 1.

Referring now to FIG. 1, a conventional valve casing 1 is shown, having the usual inlet port 2 and outlet port 3, suitable for connection by any practical means to a pipe line (not shown). The valve casing is provided with the respective communicating ports 4 and 5 respectively, with the transverse passage 6 between the ports 4 and 5. The bonnet 7 is connected to the valve casing 1 in any suitable manner and provides for the stuffing box 8, the reciprocally movable stem 9 having attachment to the closure member 11, the closure member seating on the annular inclined surface 12, as shown. This invention resides in the connection between the closure member 11 and the stem 9. The valve closure member 11 is provided with a chamber defined by the inner annular surface 13 to receive at the inner portion thereof an end thrust washer 14 and also the inner end of divided valve stem buttonhead 15, the buttonhead forming the back seat collar at its upper portion as indicated at 16 for engagement in the valve open position with the bonnet surface 17.

Referring to the disc-stem closure connection in greater detail, the upper annular walled portion 18 of the closure member is transversely formed, as shown more clearly in FIG. 2, as at 19. The dimensions of the said latter portion sufficient to receive transversely and relatively snugly a pair of substantially J-formed member 21, which when assembled within the formed portion 19, closely surround the neck portion 22 of the stem buttonhead 15. Preferably, although not necessarily, in order to hold the said J-members in secure keyed position around the stem and held positively against transverse movement, the bonnet 7 is formed as at 23 to receive the closure member 11 relatively closely to permit sliding reciprocating movement thereof and contacting the respective end limit surface 24 of each of said J-members. Thus, the said J-members are keyed in position as more clearly shown in FIG. 2 and are held in place by the cooperation between surfaces 23 and 24. It will, of course, be appreciated that as an alternative for the construction illustrated and described in the cooperating surfaces 23 and 24 of the said J-members to prevent said transverse movement, the chamber 23 may be replaced in its functioning by a simple split ring (not shown) surrounding the J-member surfaces 24 and mounted on the closure member 11 to function in a similar retaining manner to that described with respect to the bonnet inner surface 23. A suitable groove would then be provided in the closure member 11 to hold the said ring against displacement and possible loss.

The construction described permits of the connection between the stem and the closure member having the desirable advantage of a low center of gravity, especially when considering the high thrust forces applied on valves of this type when used on high fluid pressures. In this connection, it will of course be appreciated that the actual thrust load will be assumed by the portion 15 bearing against the thrust washer 14 when the valve is being seated so as to avoid any damage or deformation to the J-members mounted on the neck of the stem and engaging the closure member in the manner above described.

Directing attention to FIG. 2, let it be assumed that the valve stem is being rotated in a counterclockwise direction and thereby the valve is being opened. The J-key members under such condition will tend to be drawn inward and positively bear on the stem neck 22 when in such such valve loaded condition as occurs when the line fluid pressure is on top of the disc. This structural arrangement has the benefit of assuring the proper distribution of the thrust between the J-members and the closure member and stem during the valve opening operation. In the valve closing operation, the thrust washer 14 assumes the end thrust of the stem buttonhead 15, as shown.

While only a single embodiment is shown, this is for illustration only and without limiting the scope as measured by the terms of the appended claims.

I claim:
1. In a valve construction having a bonnet portion, the combination of a valve seat and a reciprocally movable swivelable closure member therefor engageable with said valve seat, a valve stem in telescoped relation to a hollow walled portion of said closure member, means for connecting said stem to the closure member, the said stem having a buttonhead defining the inner end limit of said telescoped relation with said closure member, the said stem buttonhead having a neck portion, the said walled portion of the closure member being transversely apertured at opposite locations defined by vertical side walls and in a plane defined by the length of said stem neck portion, a pair of oppositely disposed J-formed key members fitted in said transversely apertured walled portion of said closure member closely surrounding continuously the said stem neck portion for substantially the full length of the latter portion and means provided by said bonnet portion to continuously retain said key members in said transversely apertured walled portion to engage the said stem buttonhead neck portion.

2. The subject matter of claim 1, the said key members being substantially received within said transversely apertured walled portion to fill the apertures of said latter portion of said closure member.

References Cited by the Examiner

UNITED STATES PATENTS 2,848,187   8/58   Henry _____ 251—88

FOREIGN PATENTS 140,696   1903   Germany.
539,082   11/31   Germany.
122,493   8/48   Sweden.

M. CARY NELSON, *Primary Examiner.*